Figure 1:
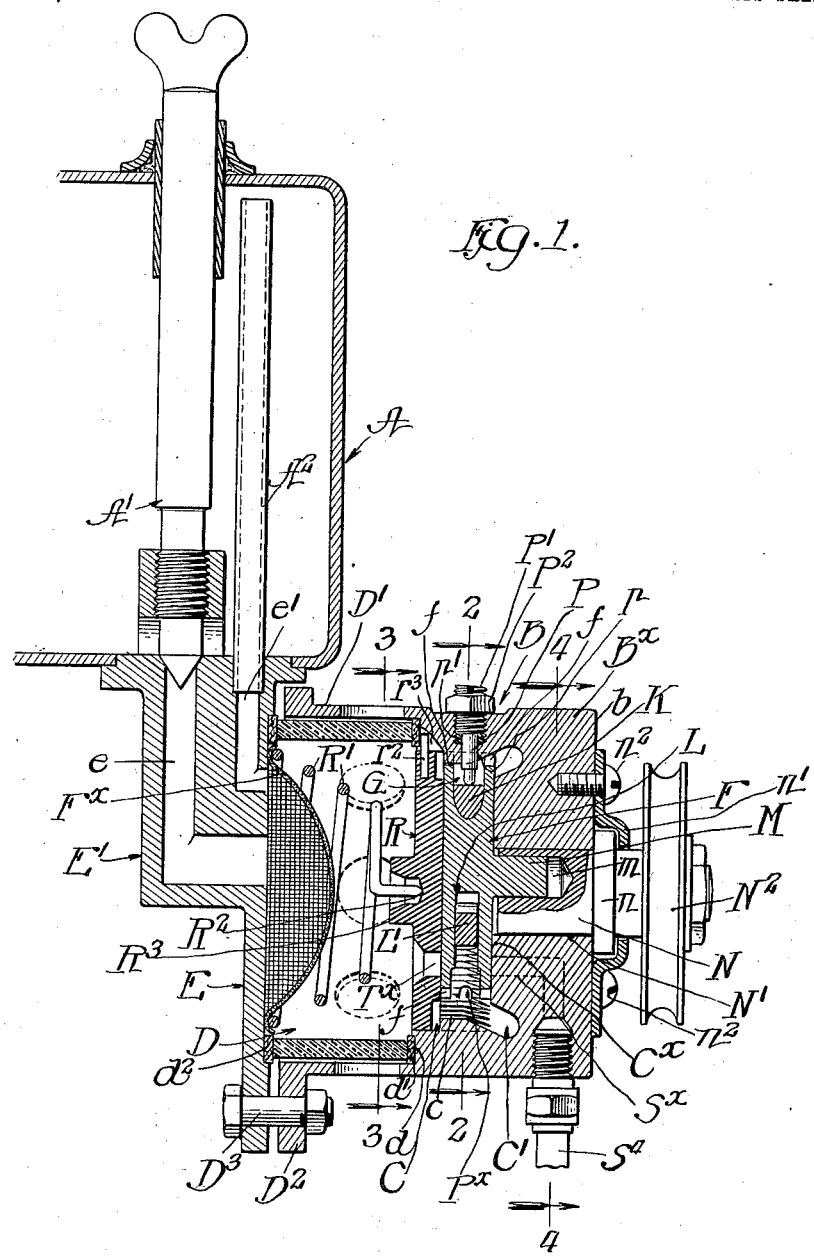

A. LEVEDAHL.
FORCE FEED OILER.
APPLICATION FILED NOV. 7, 1910.

1,029,547.

Patented June 11, 1912.
3 SHEETS—SHEET 1.

A. LEVEDAHL.
FORCE FEED OILER.
APPLICATION FILED NOV. 7, 1910.
1,029,547.
Patented June 11, 1912.
3 SHEETS—SHEET 2.
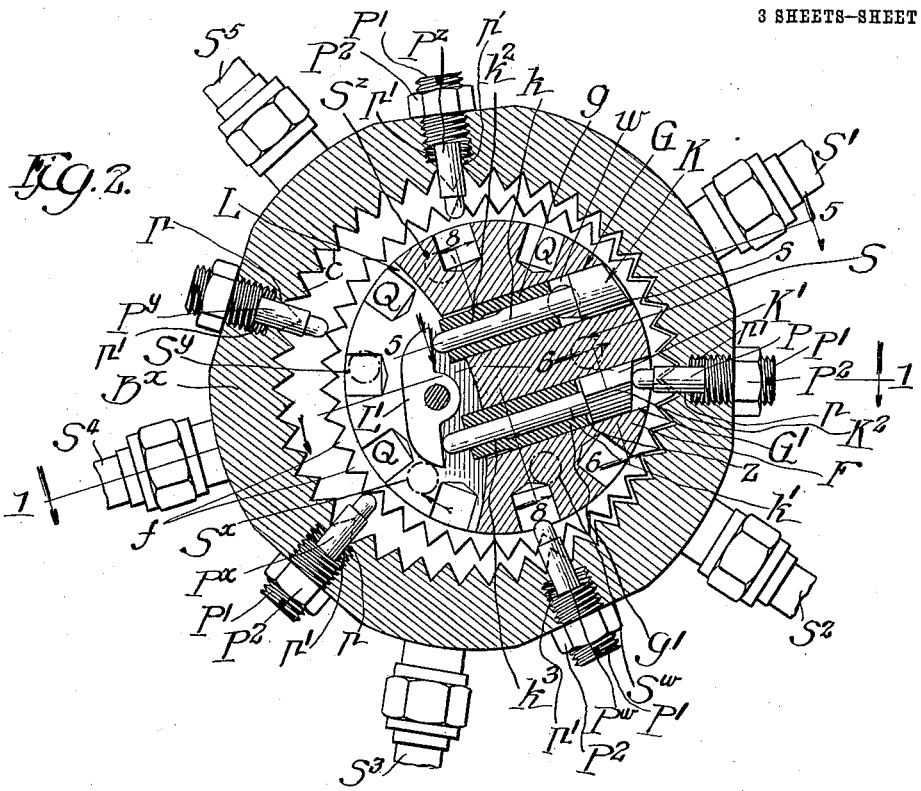
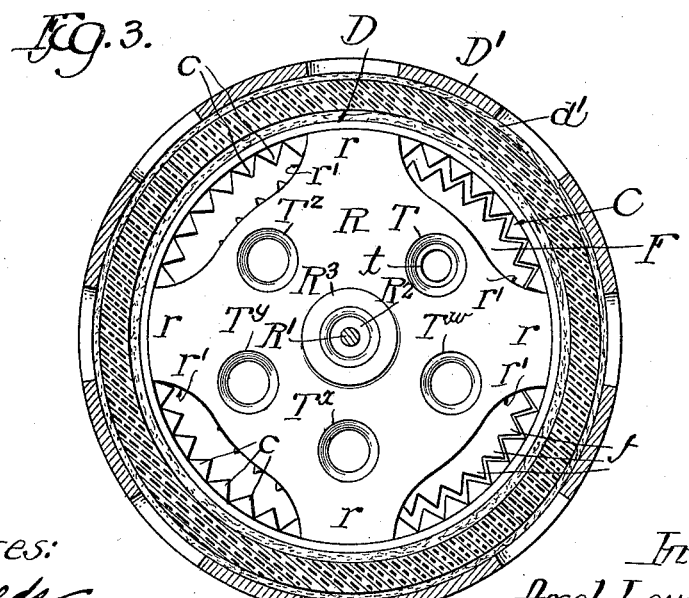

A. LEVEDAHL.
FORCE FEED OILER.
APPLICATION FILED NOV. 7, 1910.
1,029,547.
Patented June 11, 1912.
3 SHEETS—SHEET 3.
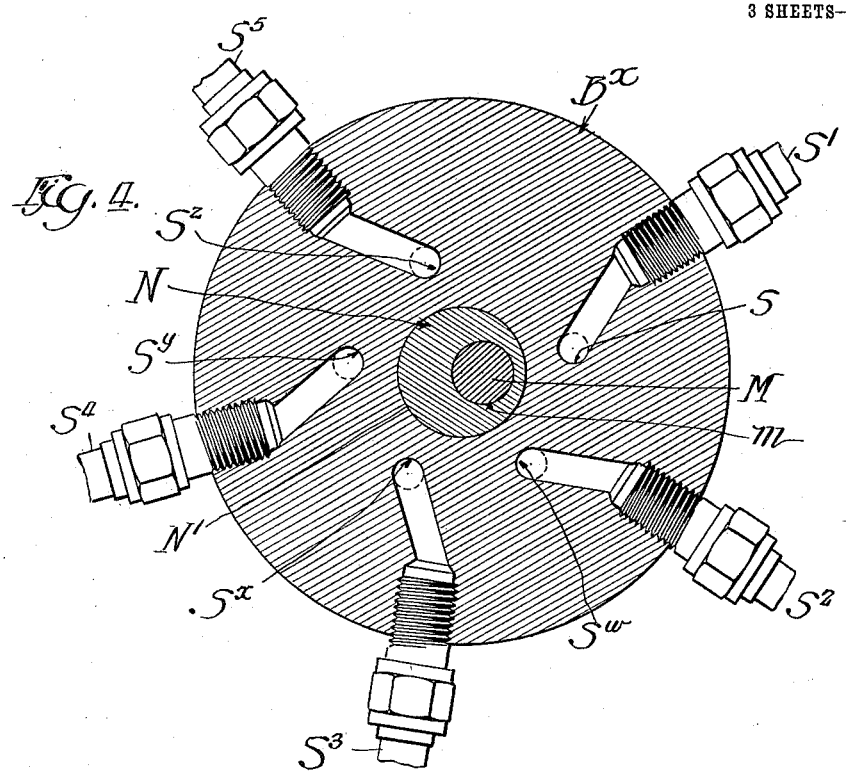
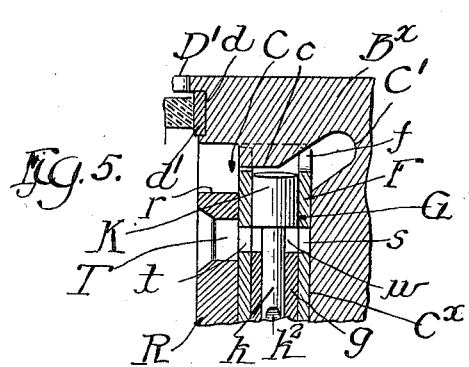
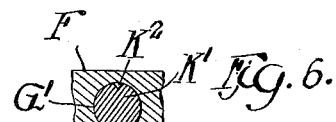
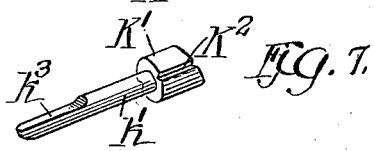
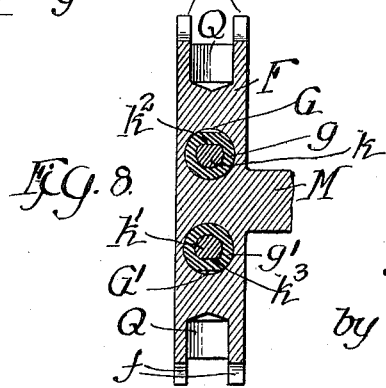
Witnesses:
Inventor
Axel Levedahl
by Poole & Brown
Attys

UNITED STATES PATENT OFFICE.

AXEL LEVEDAHL, OF AURORA, ILLINOIS, ASSIGNOR TO AURORA AUTOMATIC MACHINERY COMPANY, OF AURORA, ILLINOIS, A CORPORATION OF ILLINOIS.

FORCE-FEED OILER.

1,029,547.            Specification of Letters Patent.      Patented June 11, 1912.

Application filed November 7, 1910. Serial No. 591,012.

*To all whom it may concern:*

Be it known that I, AXEL LEVEDAHL, a citizen of the United States, and a resident of Aurora, in the county of Kane and State of Illinois, have invented certain new and useful Improvements in Force-Feed Oilers; and I do hereby declare that the following is a full, clear, and exact description thereof, reference being had to the accompanying drawings, and to the letters of reference marked thereon, which form a part of this specification.

This invention relates to a force feed oiler and consists of the matters hereinafter described and more particularly pointed out in the appended claims.

The invention relates particularly to certain novel features of construction of a force feed oiler, the general features of which are similar to those of an oiler described in an application, filed November 7, 1910, and bearing Serial Number 591,011, for "force feed oiler," the present application relating to certain modifications of the oiler of said application.

In the drawings Figure 1 is a vertical section through the oiler on the line 1—1 of Fig. 2. Fig. 2 is a vertical section through Fig. 1 on the line 2—2 thereof. Fig. 3 is a vertical section through Fig. 1 on the line 3—3 thereof. Fig. 4 is a vertical section through Fig. 1 on the line 4—4 thereof. Fig. 5 is a partial detail sectional view through Fig. 2 on the line 5—5 thereof. Fig. 6 is a partial sectional view through the disk on the line 6—6 of Fig. 2. Fig. 7 is a perspective view of one of the disk plungers. Fig. 8 is a transverse section through the disk on the line 8—8 of Fig. 2.

In the drawings A indicates an oil tank which contains the oil to be supplied to the oiler.

B indicates the oiler as a whole. Said oiler embraces a body containing the working parts of the oiler and a tubular reservoir D supported on said body and containing a supply of oil which is fed to it from the oil tank A.

At one side of the body, and preferably made integral therewith, is an annular skeleton frame $D^1$ inclosing the tubular reservoir D, which bears at its inner end against an annular shoulder $d$ formed within said skeleton frame at its base. A cork washer $d^1$ is interposed between the inner end of the tubular reservoir D and said shoulder $d$. The outer end of said tubular reservoir D is closed against a flat disk E, a cork washer $d^2$ being interposed between the two. The skeleton frame $D^1$ is provided with lugs or ears $D^2$ which are connected to the disk E by means of bolts $D^3$.

$E^1$ is a boss formed on the outer surface of the plate E and provided with an oil passage $e$ and an air passage $e^1$, both of which open through the plate E into the reservoir D. The air passage $e^1$ opens into the reservoir at a point above the oil passage $e$. To the upper end of the boss $E^1$ is secured the tank A into which said passages $e$ and $e^1$ lead. The flow of oil from the tank A to the passage $e$ is controlled by a needle valve $A^1$. The air passage $e^1$ is connected to a pipe $A^2$ which extends above the surface of the oil in the tank A. The reservoir D is never filled so as to close the passage $e^1$ so that the air pressure in the tank A and in the reservoir D will always be equalized.

C is an annular recess or chamber formed in the body B of the oiler, which chamber contains the mechanism by means of which a predetermined quantity of oil taken from the reservoir D is periodically discharged into a passageway or conduit leading to a part to be oiled. Said chamber is provided on its inner circumferential wall with a set of radial inwardly projecting teeth $c$, and back of said teeth with a flat annular wall $C^x$.

$C^1$ is an annular groove formed in the wall $C^x$ at its outer limit, which groove forms a supplemental reservoir to supply oil for the working parts of the oiler contained in said chamber.

F is a flat annular disk which has bearing against the flat surface of the wall $C^x$ of the chamber C. Said disk F is of less diameter than that of the chamber C and is eccentrically placed therein. It is provided on its periphery with horizontally spaced, parallel rows of radial teeth $f, f$ which are adapted to engage the teeth $c$ of the chamber C as said disk is rolled edgewise about the walls of said chamber with its inner surface sliding on the wall $C^x$ of said chamber. Said disk C is drilled to form apertures G, $G^1$ (see Fig. 2) which are parallel to the faces of the disk and also to a diameter of the disk and which are spaced at equal distances to one side and to the other of said diameter. Said apertures open at their outer ends between the rows of radial teeth $f, f$ of said disk. In each aperture is located a bushing $g, g^1$ which closes said apertures except at their outer ends which are open to form chambers $w$ and $z$. In the chamber $w$ is located a piston K and in the chamber $z$, a plunger $K^1$. Said piston and plunger are made integral with plunger rods $k, k^1$, respectively, which have bearing within said bushings $g, g^1$. Said plunger rods have each a flat side $k^2, k^3$ near their ends to prevent them from rotating within their respective bushings.

A section of the body of the disk F is removed to form a recess L in the plane of the plunger rods $k, k^1$, in which recess is pivotally mounted a rocking arm $L^1$ which engages at its ends against the plungers $k, k^1$. The construction is such that, (starting with the parts in the relative positions shown in Fig. 2) when the piston K is pushed inward, said piston, through its plunger rod $k$ and the rocking arm $L'$, will effect an outward movement of the plunger rod $k^1$, thus moving the plunger $K^1$ outward. The outer ends of the pistons K, $K^1$ are beveled in oppositely inclined planes so as to make the outer ends of said pistons approximate the outer perimeter of the disks. On the outer and inner faces, respectively, of the disk F are drilled an admission port $t$ and a discharge port $s$, each of which opens into the chamber $w$ in which the piston K works. The plunger head $K^1$ is provided with longitudinal grooves $K^2$, $K^2$ (Figs. 6 and 7), which will prevent oil from being confined between its inner end and the outer end of the bushing $g^1$, thus obstructing the free operation of the plunger. On the inner face of the disk F is formed a centrally disposed stud M which engages within a recess $m$ eccentrically placed in the end of a shaft N. The shaft N has bearing in an aperture $N^1$ formed in the body of the oiler at the back of the disk F and its longitudinal central axis is coincident with the central axis of the chamber C. The central axis of the stud M is positioned from the central axis of the shaft N, a distance equal to one-half of the difference between the pitch diameters of the toothed disk F and of the internally toothed chamber C. From this description it is apparent that the rotation of the shaft N will cause the stud M to revolve about the central axis of said shaft, that is to say, about the central axis of the chamber C. This in turn will cause the toothed disk F to roll edgewise around the walls of the chamber C, the teeth $f, f$ of the disk engaging the teeth $c$ on the cylindric wall of the chamber, and the rear face of the disk sliding on the wall $C^x$ of said chamber. The shaft N is provided with a collar $n$ which engages against the outer end $b$ of the body $B^x$ of the oiler and which is retained in this position by means of an apertured cap $n^1$ secured by screws $n^2$ to the body of the oiler. The shaft N is shown herein as driven by a pulley $N^2$.

R is a plate which forms the rear wall of the reservoir D and which bears against the disk F, and serves to confine the same in the chamber C. Said plate R has radial projections $r$ which engage against the cylindric wall of the chamber C. Between said projections are formed openings $r^1$, see Fig. 3, located in line with the groove $C^1$ in the wall $C^x$ of the chamber C. These openings permit the oil from the reservoir to freely enter said groove $C^1$, and fill the space between the teeth $c$ of the chamber C and the teeth $f, f$ of the disk F, so that said teeth thus run in oil. One of the projections of the plate R is provided with a pin $r^2$ which engages a notch $r^3$ cut in the end of the body $B^x$ to prevent said plate from rotating with the disk F. The plate R is held in place against the disk F by means of a spiral spring $R^1$ which bears at its inner smaller end in a socket $R^2$ formed in a boss $R^3$ on the outer surface of the plate R, and at its outer end bears against the inner face of the disk E. A wire gauze $F^x$ is preferably located so as to cover the opening of the passage $e$ into the reservoir in order to filter the oil, said gauze being shown in the drawings as supported in place by the spring $R^1$, the outer larger end of which holds the peripheral edges of said gauze in contact with the inner face of the disk E.

The plate R is provided with a series of openings or ports, in this case five in number,—T, $T^w$, $T^x$, $T^y$, $T^z$, which are arranged at equal radial distances from the center of said plate and with which the admission port $t$ in the outer face of the disk F is adapted to be brought to register in the movement of said disk. Back of said disk F are located a series of discharge passages, S, $S^w$, $S^x$, $S^y$, $S^z$, corresponding in number to the ports T, $T^w$, $T^x$, $T^y$, $T^z$, each located at points spaced at equal radial distances from the center of the chamber C and offset in a circumferential direction from the openings T, $T^w$, $T^x$, $T^y$, $T^z$ in the plate R. Such discharge passages are so arranged that the discharge port $s$ in the rear surface of the disk F will come to register with them in succession after the admission ports $t$ have passed well beyond one of the ports in the plate R and have become closed against the inner face of the plate R. Said discharge passages are open radially through the outer surface of the body of the oiler and are there connected respectively to discharge pipes, respectively, $S^1$, $S^2$, $S^3$, $S^4$, $S^5$.

P, $P^x$, $P^w$, $P^y$, $P^z$ indicate pins (see Figs. 1 and 2) projecting radially inward from the cylindric wall of the chamber C and located in the plane of the central axes of the piston K and plunger $K^1$. Said pins are adapted, as the disk F is rolled edgewise about the chamber C, to be engaged by the outer ends of the piston K and of the plunger $K^1$ in succession so as to produce a periodic and alternate reciprocation of said piston and plunger, first in one direction and then in the opposite direction. Each pin P, $P^w$, $P^x$, $P^y$, $P^z$ is located in a radial aperture $p$ in the cylindric wall of the chamber C. Said aperture is provided at its outer end with an internally screw-threaded enlargement $p^1$ to receive a screw-threaded enlarged head $P^1$ formed on the outer end of the pin. Said screw-threaded head $P^1$ projects beyond the body of the oiler and is there provided with a lock nut $P^2$. By means of this construction the pin may be adjusted radially inward or outward for a purpose which will presently appear.

In the operation of the disk in the manner as will be presently described, the plunger $K^1$ engages against the pin P for example, and is caused to reciprocate inwardly. This movement rocks the arm L' and affects an outward movement of the piston K, thus opening the piston chamber $w$. The disk F is at this time in such position that the admission port $t$ of said chamber $w$ registers with the supply port in the plate R, and as the outward movement of the piston K tends to produce a partial vacuum in the chamber $w$, oil from the reservoir is drawn into said chamber through the port T. The continued movement of the disk next brings the outer end of the piston K into engagement with the pin P, so as to cause said piston to reciprocate inwardly and thereby, through the rocker arm L, affects a corresponding outward movement of the plunger $K^1$. At the time of this movement of the piston, the discharge port $s$ of the chamber has come to register with the discharge passage S, while the admission port $t$ is closed against the inner face of the plate R. The inward movement of the piston K thus causes the oil in the piston chamber $w$ to be discharged into said passage S. In the further operation of the disk F the plunger head $K^1$ and the piston K are successively engaged against the pin $P^x$ so as to draw another charge of oil into the chamber from the reservoir through the supply port $T^x$ in the plate R and to then discharge said oil through the discharge passage $S^x$. This operation is repeated with every pin. Each supply port in the plate R and the associated discharge passages are offset from each other a distance sufficient so that the admission ports $t$ of the chamber $w$ will be closed against the inner face of the plate R when the discharge port $s$ registers with an associated discharge passage and the discharge port $s$ will be closed against the wall $C^x$ of the chamber C when the admission port $t$ registers with a supply port in the plate R. The chamber $w$ is thus alternately charged and discharged with oil, once for each pin, the discharges being made in succession through the discharge passages S, $S^w$, $S^x$, $S^y$, $S^z$. As the disk F is smaller in diameter than the chamber C it is apparent that as said disk is rolled edgewise about the circumferential walls of said chamber with its teeth engaged with the teeth of said chamber, said disk will make a part of a rotation about its own axis, each time it is rolled completely about said chamber, or each time the shaft N makes a rotation. The number of complete rotations of the disk, as compared to the number of rotations of the shaft N, depends upon the difference between the number of teeth $t$ and the number of teeth $c$. In the example illustrated there are forty-four teeth $c$ and forty teeth $f$, both multiples of four, this number representing the difference in number between the two sets of teeth. Each time the shaft N makes a complete rotation the disk F is caused to be rolled edgewise once about the inner periphery of the chamber C, but on account of the difference between the length of the circumference of the disk and the length of the circumference of the chamber, said difference being represented by the four teeth the latter has in excess of the former, the tooth of the disk which engages a certain tooth of the chamber at the beginning of rotation of the shaft N, will be four teeth back of the disk tooth which engages the said certain tooth of the chamber at the end of one rotation of the shaft; at the end of the next rotation of the shaft it will be four additional teeth or eight teeth back of the tooth engaging the said tooth of the chamber, and so on, said disk rotating on its own axis an angle subtended by four of its teeth for each rotation of the shaft N and in a direction the reverse of the direction in which said shaft is rotating. Thus, as the disk F has forty teeth, or ten times four teeth, it will be rotated on its own axis through an angle of 360° at the end of ten rotations of said shaft. The central axis of the piston K is separated from the central axis of the plunger $K^1$ by an arc subtended by four of the radial teeth $f$ of the disk. Thus if the shaft N be rotated so as to cause the disk F to roll edgewise about the circumferential walls of the chamber C in a counter-clockwise direction, as shown in Fig. 2, the said disk F will be caused to rotate on its central axis in a clockwise direction, as it appears in said figure. Thus, starting with the disk F in the position indicated in Fig. 2, with the plunger $K^1$ in line with the pin P, one rotation of the shaft N will rotate the disk on its axis through an angle subtended by four of the teeth $f$, so as to bring the piston K into engagement with the pin P. In order to make the plunger $K^1$ engage the pin $P^w$ at the end of the next rotation of the shaft N, said pin is separated from the pin P an angular distance subtended by eight teeth G. The pins P, $P^w$, $P^x$, $P^y$, $P^z$ are similarly spaced. The pins P and $P^z$, however, are separated by an angle subtended by twelve teeth, since, as will be apparent, it will be impossible to locate another pin between these two pins without causing two pins to engage respectively against the plunger $K^1$ and the piston K at the same time.

It is evident that in the operation of the disk F, points in the periphery of the disk spaced in each direction from the central axes of the plunger $K^1$ and the piston K angular distances subtended by four of the teeth $f$ or by multiples of said angle will be successively presented to the several pins, and I therefore provide in the periphery of the disk F a series of radial recesses Q, the central axes of which are separated by angles equal to the angle subtended by four teeth of the disk. Thus, when the teeth $f$ at a recess Q, come into engagement with the teeth $c$ at a pin, said pin enters said recess without interfering with the operation of the disk.

The operation of the improved oiler is apparent from the above description. By adjustment of the needle valve $A^1$ oil is permitted to flow from the tank A into the reservoir D until it reaches the level of the air passageway $e^1$ in the plate E. By means of the pulley $N^2$, which is driven from any convenient source of power, the shaft N is rotated. This causes the disk F to roll edgewise about the cylindric wall of the chamber C so as to bring the end of the plunger $K^1$ and the end of the piston K successively into engagement against the pins P, $P^w$, $P^x$, $P^y$, $P^z$. When the plunger $K^1$ strikes the pin P the admission port $t$ of the chamber $w$ registers with a supply port T in the plate R, while the exhaust port $s$ of said chamber is closed against the flat wall $C^x$ of the chamber C. Thus, as the piston K is caused to move outwardly by reason of the inward movement of the plunger $K^1$, brought about by the engagement of the latter against the pin P, oil is sucked from the reservoir through the admission port $t$ into the chamber $w$. In the further movement of the disk, the end of the piston K is brought to engage against the pin P which causes it to move inwardly and, as at this time, the exhaust ports of said chamber $w$ register with the discharge passage S, while the admission port $t$ is closed against the plate R, the inward movement of said piston discharges the oil from the piston chamber into discharge passage S. The plunger $K^1$ next engages against the pin $P^w$ which again causes an outward movement of the piston K so as to draw oil from the reservoir through the supply port $T^x$ into the chamber $w$ and thereafter the piston K is brought to engage against the pin $P^w$, which causes the discharge of this oil into the discharge $S^x$. The operation thus continues in the case of all the pins. Each pin effects first a charging and then a discharging movement of the piston K and it is therefore possible to adjust the different pins so as to make them project inwardly different distances, thereby causing each pin to effect a predetermined different length of movement of the piston, so as to discharge different amounts of oil to the associated discharge passages. Thus, each of the pipes $S^1$, $S^2$, $S^3$, $S^4$, $S^5$ may be fed with oil at different rates. This is a particular advantage of the construction described herein.

As in the oiler described in the application hereinbefore referred to, the spring $R^1$ holds the plate R yieldingly engaged against the disk F, so as to take up the wear of the parts and thus always insure a tight joint. In addition, as in that oiler, the admission and exhaust ports are never open at the same time, so that there is no danger of partial vacuum, air bubbles or pressure being communicated to the pipes or discharge passages, through which the oil is delivered.

While in illustrating one embodiment of my invention, I have shown and described certain details of mechanical construction and arrangement, it is apparent that these may be modified in various ways without departing from the spirit of my invention and I do not wish to be limited thereby except as pointed out in the appended claims.

I claim as my invention:—

1. In combination with a reservoir, a closure for said reservoir, embracing bearing members and an interposed, relatively movable sliding member engaged between said bearing members, said relatively movable member having a piston chamber provided with an admission port and an exhaust port, each closed against one of said bearing members, a reciprocable piston in said piston chamber, a plurality of supply ports in one bearing member opening into the reservoir, a like number of discharge passages in the other bearing member each offset from an associated supply port, automatic means for producing relative movement of the members to alternately bring said admission port of said piston chamber to register with a supply port, and its exhaust port to register with an associated discharge passage, automatic means for reciprocating said piston and adjusting means acting to vary the length of movement of said piston in the case of each of the several pairs of associated supply ports and discharge passages.

2. In combination with a reservoir, a closure for said reservoir, embracing bearing members and an interposed, relatively movable sliding member engaged between said bearing members, said relatively movable member having a piston chamber provided with an admission port and with an exhaust port, each closed against one of said bearing members, a reciprocable piston in said piston chamber, a reciprocable plunger carried by said relatively movable member adapted to impart movement to said piston and to be moved thereby, a plurality of supply ports in one bearing member opening into the reservoir, a like number of discharge passages in the other bearing member, each offset from an associated supply port, automatic means for producing relative movement of the members to alternately bring said admission port of said piston chamber to register with a supply port and its exhaust port to register with an associated discharge passage, a like number of affixed members adapted to be engaged alternately by said piston and said plunger, and means for independently adjusting said fixed members to vary the length of movement of said piston in the case of each fixed member.

3. In combination with a reservoir, a chamber adjacent said reservoir having a flat wall and a surrounding cylindric wall, a flat disk bearing against the flat wall of said chamber and engaging at its peripheral edges against the cylindric wall of said chamber, said disk being of less diameter than said chamber and being eccentrically placed therein, a flat plate intermediate said flat chamber wall and said reservoir bearing against said flat disk and confining the same within said chamber, a piston chamber in said disk having an admission and an exhaust port oppositely disposed, said exhaust port being closed against the flat wall of said chamber, and said admission port being closed against said plate, a piston reciprocable in said piston chamber, a plunger movable with said piston, a second plunger carried by said disk, a rocking-arm carried by said disk engaging the inner ends of said plungers whereby the movement of one will effect an equal movement of the other, means for causing said disk to roll edgewise about the cylindric wall of said chamber with its opposite faces in sliding engagement between said plate and said flat chamber wall, said plate and flat chamber wall being provided respectively with a supply port and discharge passage offset from each other and positioned to alternately register with the associated ports of said piston chamber in the movement of said disk, and means located in said chamber adapted to be engaged successively by the outer end of said piston and the outer end of said second plunger to reciprocate said piston.

4. In combination with a reservoir, a chamber adjacent said reservoir having a flat wall and a surrounding cylindric wall provided with internal radial teeth, a flat disk bearing against the flat wall of said chamber and provided with peripheral teeth adapted to engage the teeth of said chamber, said disk being of less diameter than said chamber and being eccentrically placed therein, said disk and chamber each having a number of teeth which is a multiple of the difference between the numbers of teeth contained by them, a flat plate intermediate said flat chamber wall and said reservoir bearing against said flat disk and confining the same within said chamber, a piston chamber in said disk having an admission and an exhaust port oppositely disposed, said exhaust port being closed against the flat wall of said chamber, and said admission port being closed against said plate, a piston reciprocable in said piston chamber, a plunger movable with said piston, a second plunger carried in said disk, a rocking-arm carried by said disk engaging the inner ends of said plungers whereby the movement of one will effect an equal movement of the other, means for causing said disk to roll edgewise about the cylindric walls of said chamber with its opposite faces in sliding engagement between said plate and said flat chamber wall, said plate and flat chamber wall being provided respectively with a supply port and discharge passage offset from each other and positioned to alternately register with the associated ports of said piston chamber in the movement of said disk, and a pin located in said chamber wall adapted in succession to be engaged by the outer end of said piston and the outer end of said second plunger.

5. In combination with a reservoir, a chamber adjacent said reservoir having a flat wall and a surrounding cylindric wall, a flat disk bearing against the flat wall of said chamber and engaging at its peripheral edge against the cylindric wall of said chamber, said disk being of less diameter than said chamber and being eccentrically placed therein, a flat plate intermediate said flat chamber wall and said reservoir bearing against said flat disk and confining the same within said chamber, a piston chamber in said disk having an admission and an exhaust port oppositely disposed, said exhaust port being closed against the flat wall of said chamber, and said admission port being closed against said plate, a piston reciprocable in said piston chamber, a plunger movable with said piston, a second plunger carried by said disk, a rocking-arm carried by said disk engaging the inner ends of said plungers whereby the movement of one will effect an equal movement of the other, means for causing said disk to roll edgewise about the cylindric walls of said chamber with its opposite faces in sliding engagement between said plate and said flat chamber wall, said plate and flat chamber wall being provided respectively with a plurality of supply ports and an equal number of associated discharge passages, each discharge passage being offset from its associated supply port in the plate and positioned to alternately register with the associated ports of said piston chamber in the movement of said disk, a like number of pins located in said chamber wall, each adapted to be engaged by the outer end of said piston and the outer end of said second plunger in succession, and means for independently adjusting said pins to determine the distance moved by said piston in the case of each pin.

6. In combination with a reservoir, a chamber adjacent said reservoir having a flat wall and a surrounding cylindric wall provided with internal radial teeth, a flat disk bearing against the flat wall of said chamber and provided with peripheral teeth adapted to engage the teeth of said chamber, said disk being of less diameter than said chamber and being eccentrically placed therein a distance equal to one-half the difference between the pitch diameters of the teeth of said disk and chamber, said disk and chamber each having a number of teeth which is a multiple of the difference between the number of teeth contained by them, a flat plate intermediate said flat chamber wall and said reservoir bearing against said flat disk and confining the same within said chamber, said disk being provided with parallel apertures opening through its peripheral edge, bushings located in said apertures and terminating short of the perimeter of said disk to form respectively a piston chamber and a plunger chamber, a piston and a plunger reciprocable in their respective chambers, rods having bearing in said bushings and rigidly connected, one to said plunger and one to said piston, a rocking arm carried by said disk engaging the inner ends of said rods whereby movement of one rod will communicate a movement in the opposite direction to the other rod, said piston chamber being provided with an admission port and an exhaust port oppositely disposed, means for causing said disk to roll edgewise about the cylindric walls of said chamber with its opposite faces in sliding engagement between said plate and said flat chamber wall, said plate and flat chamber wall being provided respectively with a supply port and discharge passage offset from each other and positioned to alternately register with the associated ports of said piston chamber in the movement of said disk, and a pin located in said chamber wall adapted in succession to be engaged by the outer end of said piston and the outer end of said second plunger.

7. In combination with a reservoir, a chamber adjacent said reservoir having a flat wall and a surrounding cylindric wall provided with internal radial teeth, a flat disk bearing against the flat wall of said chamber and provided with peripheral teeth adapted to engage the teeth of said chamber, said disk being of less diameter than said chamber and being eccentrically placed therein a distance equal to one-half the difference between the pitch diameters of the teeth of said disk and chamber, said disk and chamber each having a number of teeth which is a multiple of the difference between the number of teeth contained by them, a flat plate intermediate said flat chamber wall and said reservoir bearing against said flat disk and confining the same within said chamber, said disk being provided with parallel apertures opening through its peripheral edge, bushings located in said apertures and terminating short of the perimeter of said disk to form respectively a piston chamber and a plunger chamber, a piston and a plunger reciprocable in their respective chambers, rods having bearing in said bushings and rigidly connected, one to said plunger and one to said piston, a rocking arm carried by said disk engaging the inner ends of said rods whereby movement of one rod will communicate a movement in the opposite direction to the other rod, said piston chamber being provided with an admission port and an exhaust port oppositely disposed, means for causing said disk to roll edgewise about the cylindric walls of said chamber with its opposite faces in sliding engagement between said plate and said flat chamber wall, said plate and flat chamber wall being provided respectively with a plurality of supply ports and an equal number of associated discharge passages, each discharge passage being offset from its associated supply port in the plate and positioned to alternately register with the associated ports of said piston chamber in the movement of said disk, a like number of pins located in said chamber wall, each adapted to be engaged by the outer end of said piston and the outer end of said second plunger in succession, and means for independently adjusting said pins to determine the distance moved by said pin in the case of each piston.

8. In a device of the character described, a disk provided with two spaced bores parallel to each other and to a diameter of said disk, bushings located in each bore, each terminating short of the outer ends of said bores to leave chambers opening through the periphery of said disk, a piston located in one chamber and a plunger in the other, plunger rods each connected at its outer end respectively to said piston and plunger and having bearing in said bushings, the inner end of each rod projecting beyond the inner end of said bushings, a chamber in said disk adjacent the inner ends of said rods, and a rocking arm pivotally mounted in said chamber and engaging the inner ends of said rods whereby the movement of one will effect an opposite movement of the other.

9. In a device of the character described, a disk provided with two spaced bores parallel to each other and to a diameter of said disk, bushings located in each bore, each terminating short of the outer ends of said bores to leave chambers opening through the periphery of said disk, a piston located in one chamber and a plunger in the other, said plunger being provided with longitudinal grooves, plunger rods each connected at its outer end respectively to said piston and plunger and having non-rotative, reciprocable bearing in said bushings, the inner end of each rod projecting beyond the inner end of said bushings, a chamber in said disk adjacent the inner ends of said rods, and a rocking arm pivotally mounted in said chamber and engaging the inner ends of said rods whereby the movement of one will effect an opposite movement of the other.

In testimony, that I, claim the foregoing as my invention I affix my signature in the presence of two witnesses, this 2nd day of November A. D. 1910.

AXEL LEVEDAHL.

Witnesses:
 FRANK S. RHOADS,
 R. A. NORLING.

---

Copies of this patent may be obtained for five cents each, by addressing the "Commissioner of Patents, Washington, D. C."